(12) United States Patent
Inokuchi

(10) Patent No.: US 6,332,721 B1
(45) Date of Patent: Dec. 25, 2001

(54) LASER DIODE MODULE

(75) Inventor: Yukio Inokuchi, Ushiku (JP)

(73) Assignee: Mitsubishi Chemical Corp., Tokyo (JP)

( * ) Notice: Subject to any disclaimer, the term of this patent is extended or adjusted under 35 U.S.C. 154(b) by 0 days.

(21) Appl. No.: 09/349,463

(22) Filed: Jul. 9, 1999

(30) Foreign Application Priority Data

Jul. 10, 1998 (JP) .................................................. 10-211893
Jul. 10, 1998 (JP) .................................................. 10-211894
Mar. 30, 1999 (JP) .................................................. 11-089566

(51) Int. Cl.⁷ .............................. G02B 6/00; G02B 6/36
(52) U.S. Cl. ............................................. 385/93; 385/147
(58) Field of Search ................................. 385/88–94, 147

(56) References Cited

U.S. PATENT DOCUMENTS

| 4,966,444 | * | 10/1990 | Droegemueller et al. ............. 385/33 |
| 5,542,018 | | 7/1996 | Kuhara ................................... 385/92 |
| 5,717,804 | | 2/1998 | Pan ......................................... 385/94 |
| 5,721,426 | * | 2/1998 | Sakai et al. ...................... 250/227.24 |
| 5,940,557 | | 8/1999 | Harker . | |

FOREIGN PATENT DOCUMENTS

| 0 294 650 A2 | 12/1988 | (EP) . |
| 9 802 433 A1 | 10/1997 | (EP) . |
| 60-153010 | 8/1985 | (JP) . |
| 05203843 | * | 8/1993 | (JP) .......................................... 385/93 |

OTHER PUBLICATIONS

Patent Abstracts of Japan, vol. 011, No. 334 (p. 631), Oct. 31, 1987, JP 62 115404 A (NEC Corp.), May 27, 1987.
Patent Abstracts of Japan, vol. 014, No. 398 (p. 1097), Aug. 28, 1990, JP 02 14807 A (NEC Corp.), Jun. 8, 1990.
Patent Abstracts of Japan, vol. 1995, No. 01, Feb. 28, 1995, JP 06 289238 A (The Furukawa Electric Co., Ltd.) Oct. 18, 1994.

* cited by examiner

Primary Examiner—Akm E. Ullah
(74) Attorney, Agent, or Firm—Armstrong, Westerman, Hattori, McLeland & Naughton, LLP

(57) ABSTRACT

An LD module is provided in having an LD light source having a CAN package structure in which an LD chip is incorporated with an LD preservation gas, an optical fiber on one end of which a convex fiber lens for condensing light is formed, and a lens system for coupling placed between the LD light source and the convex fiber lens, wherein the lens system is constituted to be capable of forming an image by condensing the LD light from the LD chip, and wherein the convex fiber lens is located so that a focal point coincides with the image forming point of the LD light. According to the LD module of the invention, the light coupling efficiency between the LD chip and the optical fiber can be improved without losing the life span reliability of the LD chip having a CAN package structure.

34 Claims, 5 Drawing Sheets

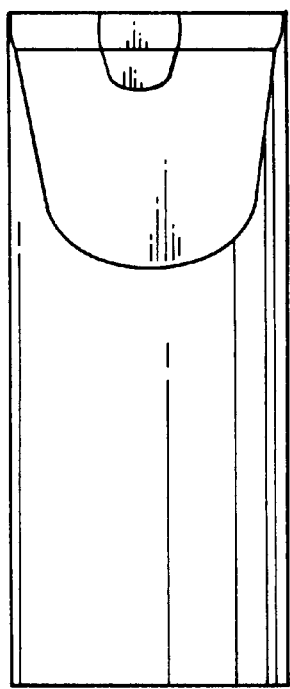
Fig.4(A)
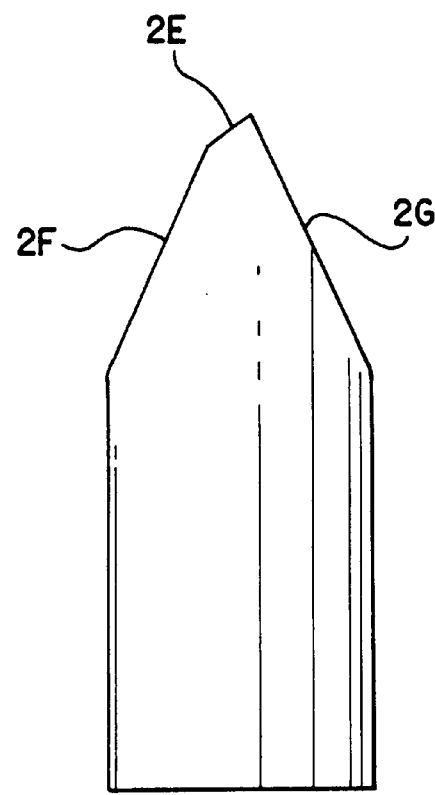
Fig.4(B)
Fig.4(C)
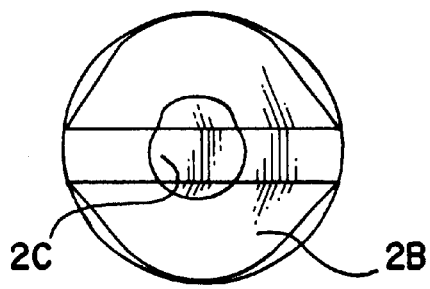

LASER DIODE MODULE

BACKGROUND OF THE INVENTION

1. Field of the Invention

This invention relates to a laser diode (hereinafter referred to as "LD") module and, more particularly, to an LD module capable of improving optical coupling efficiency between an LD chip and an optical fiber without reducing life span reliablity on a CAN-packaged LD chip.

2. Description of Related Art

LD module is a module for optical telecommunication in which an LD light source incorporating an LD chip is optically coupled to an optical fiber. As the LD light source, an LD light source having a structure, as a CAN package, that an LD chip is mounted with an LD preservation gas having a main component of an inert gas has been known to improve the life span reliability.

With such an LD module, LD light emitted from the LD chip is polarized in a prescribed direction, and is radiated in an elliptical shape to one end of the optical fiber. The optical coupling efficiency between the LD light source and the optical fiber is therefore generally low, and to compensate this, the LD chip has to be used with a large output. When the LD chip is used with a large output, however, the life span of the LD chip is shortened as a current status, thereby raising a problem of low life span reliablity in the LD module.

As a means for improving the optical coupling efficiency of the LD module without using the LD chip with a large output, forming a convex fiber lens on one end of the optical fiber for effectively condensing the LD light by correcting an aspect ratio of the LD light has been proposed (see, Japanese Unexamined Patent Publication (KOKAI) Heisei No. 8-86,923 or Japanese Unexamined Patent Publication (KOKAI) Heisei No. 8-5,865). With an LD module of this kind, the LD chip can be used with a lower output, so that the chip can keep the life span reliability.

A following problem, however, may occur where an optical fiber having a convex fiber lens is coupled to an LD light source having a CAN package structure. That is, because the convex fiber lens has a very short focal distance, the lens must be ordinarily placed in proximity of 1 to 20 microns from the LD chip. Accordingly, the one end of the optical fiber, together with the convex fiber lens, must be inserted in the above CAN package. However, it is very difficult with the current technical level to maintain an adequately gas-sealed state where the one end of the optical fiber is inserted in the above structure.

This invention is devised in consideration of the above problems. It is an object of the invention to provide an LD module capable of improving optical coupling efficiency between an LD chip and an optical fiber without reducing life span reliability on a CAN-packaged LD chip. Other objects of the invention can be understood from the description of this specification as below.

SUMMARY OF THE INVENTION

As a consequence that the inventors of this invention made extensive researches to accomplish the above objects, the inventors reached an LD module including: an LD light source having a CAN package structure in which an LD chip is incorporated with an LD preservation gas; an optical fiber on one end of which a convex fiber lens for condensing light is formed; and a lens system for coupling placed between the LD light source and the convex fiber lens, wherein the lens system is constituted to be capable of forming an image by condensing the LD light from the LD chip, and wherein the convex fiber lens is located so that a focal point coincides with the image forming point of the LD light.

In a preferred embodiment of the invented LD module, the optical fiber may be a polarized plane maintaining fiber; a polarization maintaining axis of the polarization maintaining fiber may be placed to coincide with the polarization direction; the LD light source, the optical fiber, and the lens system may be so located that a polarization extinction ratio of the LD light transmitting through the polarization maintaining fiber is equal to or greater than 10 dB; the polarization extinction ratio may be equal to or greater than 20 dB; the convex fiber lens may be formed to have an opening angle in a vertical axis direction perpendicular to the optical axis direction of the optical fiber and an opening angle in a horizontal axis direction perpendicular to the optical axis direction of the optical fiber wherein the opening angle in the horizontal axis direction is different from the opening angle in the vertical axis direction; an angle between the vertical axis direction and a through axis as a polarization maintaining axis perpendicular to the optical axis direction of the optical fiber may be set 20 degrees or less; the angle between the vertical axis direction and the through axis may be zero degree; the convex fiber lens may be in a shape having an apex; the convex fiber lens may be made of two inclined planes which come closer to each other as approaching to a tip of the optical fiber; a ridgeline between the two inclined planes may not overlap on the vertical axis; the convex fiber lens may be made of a tip end surface and two inclined continuation planes which intersect with the tip end surface and come closer to each other as approaching to a tip of the optical fiber; the tip end surface may be a curving surface; the tip end surface may be a flat surface; the tip end surface may not intersect the optical axis direction of the optical fiber with right angle; at least one of the two inclined continuation planes may include a curving surface; the two inclined continuation planes may include only flat surfaces; each of the two inclined continuation planes may include an inclined flat surface; a difference between an angle formed between one of the inclined flat surface of the convex fiber lens and the optical axis of the optical fiber and an angle formed between the other of the inclined flat surface of the convex fiber lens and the optical axis of the optical fiber may be equal to or less than 10 degrees; a distance between a line formed by intersecting the two inclined flat planes of the convex fiber lens with each other and the optical axis of the optical fiber may be equal to or less than 1 micron; an angle between the tip end surface of the convex fiber lens and a plane perpendicular to the optical axis of the optical fiber may be of 6 to 15 degrees; an intersecting line between one inclined continuation plane of the convex fiber lens and the tip end surface and another intersecting line between the other inclined continuation plane of the convex fiber lens and the tip end surface may be parallel to each other; an intersecting line between one inclined continuation plane of the convex fiber lens and the tip end surface may be located on a tip side more than another intersecting line between the other inclined continuation plane of the convex fiber lens and the tip end surface; a ridgeline exists which is formed by the two inclined continuation planes of the convex fiber lens; any ridgeline may not exist which is formed by the two inclined continuation planes of the convex fiber lens; a width of the tip end surface of the convex fiber lens may be narrower than a diameter of a mode field of the optical fiber; the convex fiber lens may have an anti-reflecting coating on a surface of the lens; the optical fiber may be a single mode optical fiber; a part of the lens system may be incorporated in the light transmission window of the LD light source; an image forming magnification of the LD light of the lens system may be of 0.5 to 10; the optical fiber may serve as an external resonator for stabilizing a center wavelength of the LD light by Bragg reflection of the LD light emitted form the LD chip; effective reflection factor $K^2 Rg$ may be greater than reflection factor R of a front end surface of the LD light source where reflection factor of the external resonator is Rg and coupling efficiency of the LD light source and the optical fiber is K; the center wavelength of the LD light may be of 500 to 1400 nm; the center wavelength of the LD light may be of 700 to 1000 nm.

In another aspect of the invention, an optical fiber having a lens includes a fiber portion, and a convex lens formed at an end of the fiber portion, the convex lens having two inclined planes which come closer to each other as approaching to a tip of the optical fiber, wherein a ridgeline between the two inclined planes does not overlap on the vertical axis. Moreover, according to still another aspect of the invention, an optical fiber having a lens includes a fiber portion; and a convex lens formed at an end of the fiber portion and made of a tip end surface with which the vertical axis intersects and two inclined continuation planes which intersect with the tip end surface and come closer to each other as approaching to a tip of the optical fiber.

BRIEF DESCRIPTION OF THE DRAWINGS

The above and other objects and features of the invention are apparent to those skilled in the art from the following preferred embodiments thereof when considered in conjunction with the accomplished drawings, in which:

FIGS. 4(*a*), 4(*b*), and 4(*c*) are illustrations showing the optical fiber having the convex lens when seen in directions of arrows (A), (B), and (C), respectively, in FIG. 3.

DESCRIPTION OF THE PREFERRED EMBODIMENTS

Figure 1:
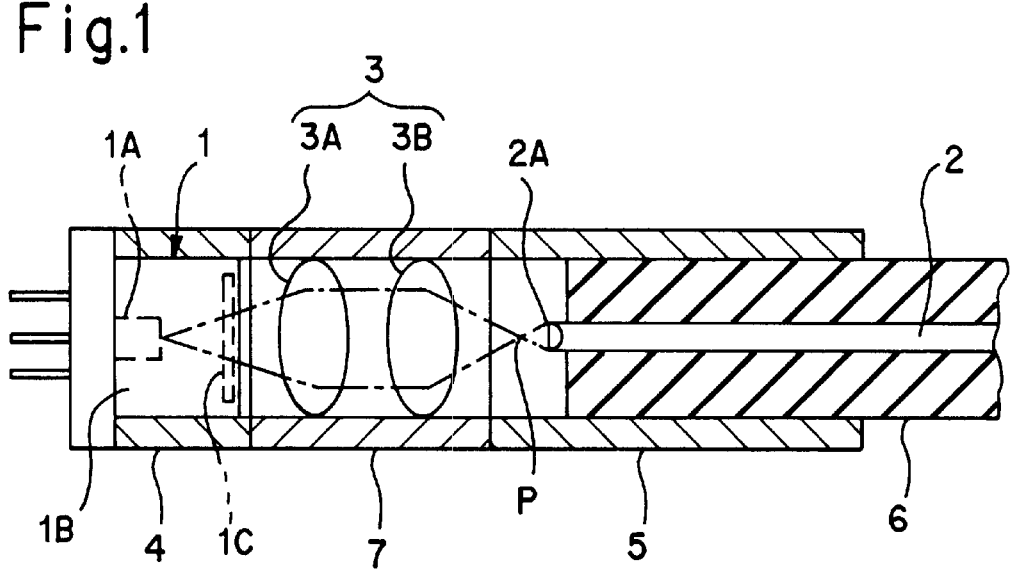
FIG. 1 is a vertical cross section showing the whole structure of an LD module according to the invention.

Referring to the drawings, an LD module according to the invention is hereinafter described in detail. The LD module according to the invention, for example, includes at least, as shown in FIG. 1, an LD light source (1) having a CAN package structure in which an LD chip (1A) is incorporated with an LD preservation gas, an optical fiber (2) on one end of which a convex fiber lens (2A) for condensing light is formed, and a lens system (3) for coupling placed between the LD light source (1) and the convex fiber lens (2A). The LD module according to the invention has a feature that the lens system (3) is constituted to be capable of forming an image by condensing the LD light from the LD chip (1A) and that the convex fiber lens (2A) is located so that a focal point (P) coincides with the image forming point of the LD light.

The LD chip (1A) of the LD light source is sealed in a CAN (1B) with the LD preservation gas having a main component of an inert gas such as nitrogen gas or the like. The LD chip (1A) emits an LD light ray having a center wavelength of, e.g., 700 to 1,000 nm, preferably 900 to 1,000 nm, more preferably about 980 nm. The output of the LD chip is for example 300 mW. The LD light has an aspect ratio of about 2 to 5 and is emitted in an elliptical shape outside the CAN (1B) through a light transmission glass (1C) fitted in a light tranmission window. The LD light source (1) is held in a cylindrical light source holder (4) where the light transmission glass window (1C) orients to the one end.

The lens system (3) is contituted so that the LD light radiated from the LD chip (1A) is condensed to form images at a focal point of the convex fiber lens (2A). The detailed structure of the lens system (3) is not specifically limited as far as those conditions are satisfied, but ordinarily, the system is made of a pair of convex lenses (3A, 3B) as shown in FIG. 1. In FIG. 1, the pair of the two lenses (3A, 3B) are held within a cylindrical lens holder (7) one end of which is welded in advance by laser beam to an end of a ferrule holder (5) on a side of the convex fiber lens (2A). The other end of the lens holder (7) is welded by laser beam to an end of the light source holder (4) on a side that the LD light is radiated.

In this LD module of the invention, either of the convex lenses (3A, 3B) of the lens system (3) can be mounted in lieu of the light transmission glass (1C) to the light transmission window of the LD light source (1). When such a structure is used, the whole length of the LD module can be shortened, and the structure can be made compact.

The magnification rate of the lens system (3) is for example 0.5 to 10 times, preferably 1 to 2 times. Where a corrected magnification rate of the LD light is used for the lens system, it is possible that the mode field pattern of the LD chip and the mode field pattern of the fiber lens completely match to each other.

Figure 2:
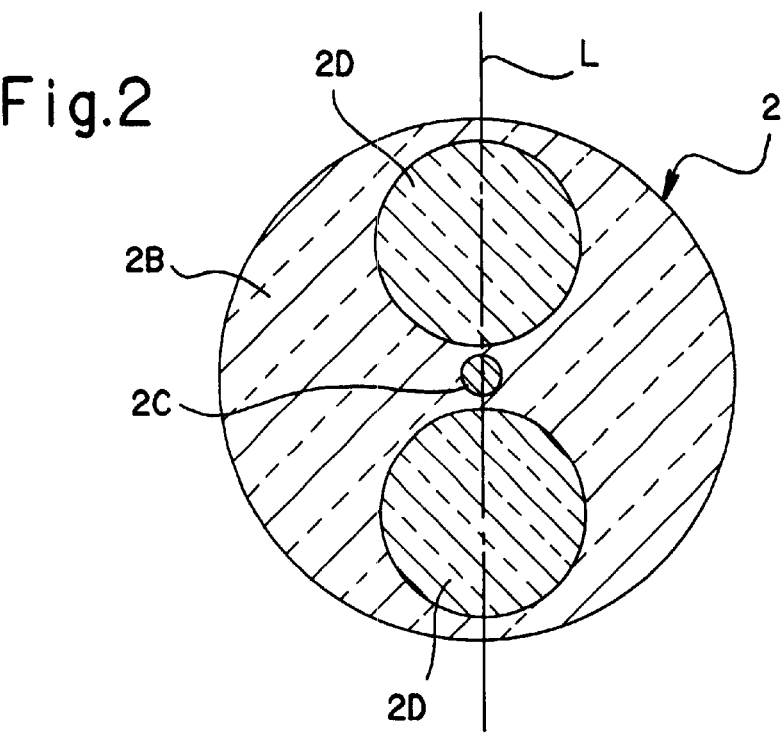
FIG. 2 is a crosswise cross section showing a polarization maintaining fiber as an optical fiber constituting the LD module according to the invention.

The detailed structure of the optical fiber (2) is not specifically limited as far as the a convex fiber lens (2A) for condensing the light is formed on one end of the fiber. For example, the optical fiber (2) may be formed of a polarization maintaining fiber, which is so called to as a PANDA fiber having a circle cross section, and as shown in FIG. 2, it is preferable to have a structure that a core (2C) having a larghe refractive index is arranged at a center of a clad (2B) having a smaller refractive index where stress application portions (2D, 2D) having a circle cross section are provided on the opposite sides of the core. The optical fiber (2) has a diameter of, e.g., about 125 microns and is generally held by a ferrule (6) at a center of the cylindrical ferrule holder (5).

The convex fiber lens (2A) preferably has an opening angle in a vertical axis direction perpendicular to the optical axis direction of the optical fiber (2) and an opening angle in a horizontal axis direction perpendicular to the optical axis direction of the optical fiber wherein the opening angle in the horizontal axis direction is different from the opening angle in the vertical axis direction. As a representitive example, a fiber lens having a structure with an apex can be exemplified. In this specification, "vertical axis" means a axis on a plane perpendicular to the optical axis direction projected from a center line of the tip end surface (or a ridgeline if no tip end surface exists). The center line on the tip end surface indicates a center line between an intersecting line of the tip end surface and one inclined plane and an intersecting line of the tip end surface and the other inclined plane.

Figure 3:
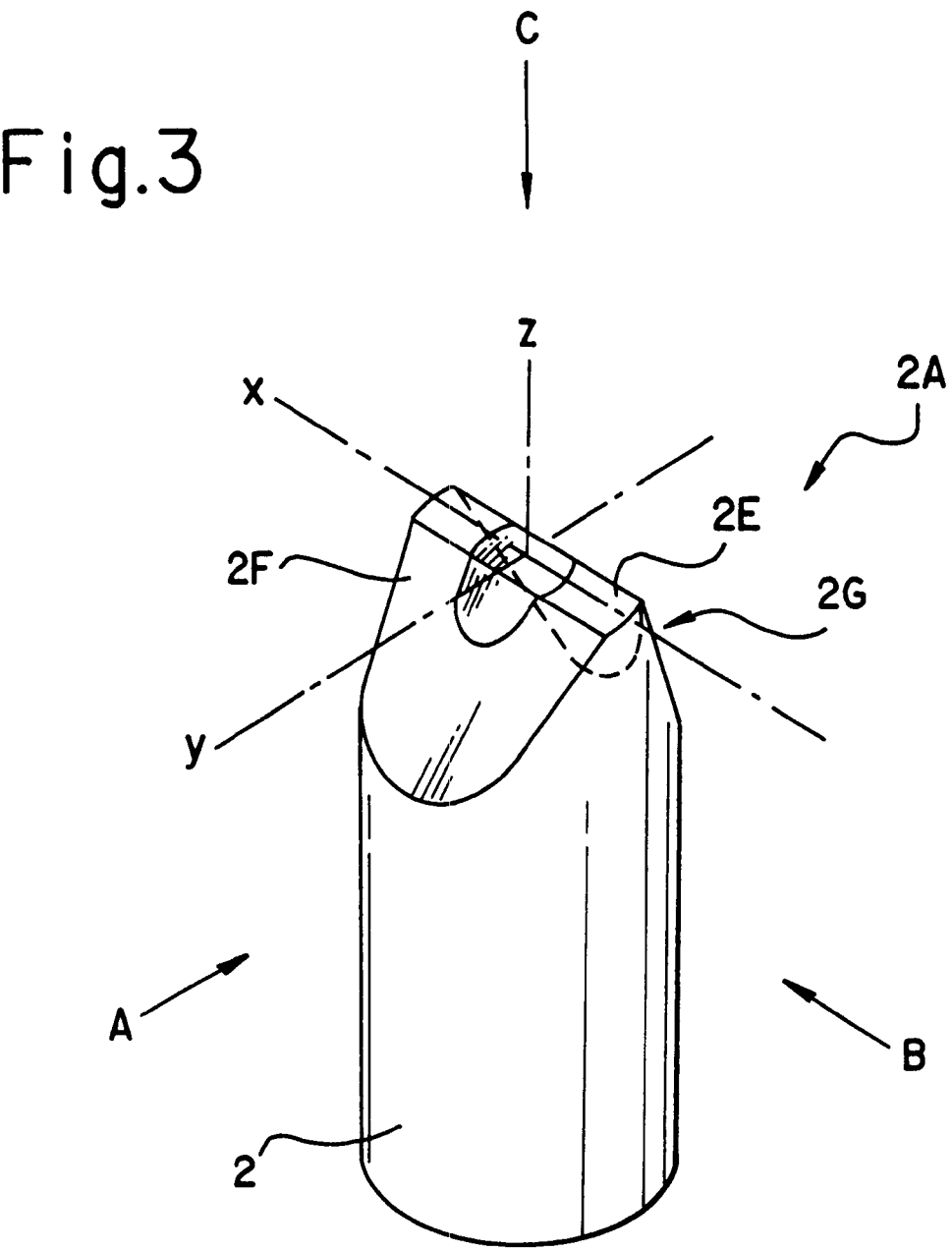
FIG. 3 is a perspective view showing an embodiment of an optical fiber having a convex lens constituting the LD module according to the invention.

FIG. 3 is a perspective view showing a fundamental shape of an optical fiber having a typical convex fiber lens on a tip side. FIGS. 4(a), 4(b), and 4(c) are illustrations showing the optical fiber having the convex lens when seen in directions of arrows (A), (B), and (C), respectively, in FIG. 3. It is to be noted that the core diameter is depicted relatively in a large size for an illustrative purpose in FIGS. 3 to 7.

The tip of the optical fiber shown in FIG. 3 is constituted of three facets: two inclined continuation planes (2F, 2G) which come closer to each other as approaching to the tip of the optical fiber, and a tip end surface (2E) intersecting with the two inclined continuation planes. In FIG. 3, each of the two inclined continuation planes (2F, 2G) is made of a single flat surface (inclined flat surface), but the inclined continuation plane can be made of two or more flat surfaces. That is, the inclined continuation planes (2F, 2G) can be a continuation surface made of two or more different flat surfaces, each having different inclined angles. The two inclined continuation planes (2F, 2G) can be symmetric or asymmetric.

In the convex fiber lens in FIG. 3, the angle between the inclined flat surface (2F) and the optical axis (z) is equal to the angle between the inclined flat surface (2G) and the optical axis (z). A virtual intersecting line at which the two inclined flat surfaces (2F, 2G) intersect with each other is designed to intersect with the optical axis (z) with a right angle. The angle between the virtual intersecting line perpendicular to the optical axis and the tip end surface (2E) is 15 degrees. The intersection lines among the tip end surface (2E) and the two inclined flat surfaces (2F, 2G) are parallel to each other.

In this invention, notwithstanding the structure shown in FIG. 3, the angles between the inclined flat surfaces (2F, 2G) and the optical axis (z) are of 10 to 80 degrees, preferably 20 to 50 degrees, more preferably 30 to 40 degrees. In the embodiment shown in FIGS. 3, 4, the angle between the inclined flat surface (2F) and the optical axis (z) is equal to the angle between the inclined flat surface (2G) and the optical axis (z), but those angles can be different from each other. The difference between the angles can be more than one degree, but preferably 10 degrees or less, more preferably 7 degrees or less.

It is preferable to set the angles between the inclined flat surfaces (2F, 2G) and the optical axis (z) according to a size of the light source to be coupled and a size of the tip end surface (2E). It is also preferable to set the angles as to minimize a problem due to returning light ray in combination of the inclination of the tip end surface (2E).

To make higher the coupling efficiency in this invention, it is preferable to render the distance (axial deviation) between the optical axis (z) and the virtual intersecting line of the two inclined flat surfaces (2F, 2G) small. The distance between the virtual intersecting line and the optical axis (z) is preferably of 1 micron or less, more preferably 0.5 micron or less, further preferably 0.3 micron, and the best way is to intersect the virtual intersecting line and the optical axis (z) with each other.

Figure 5:
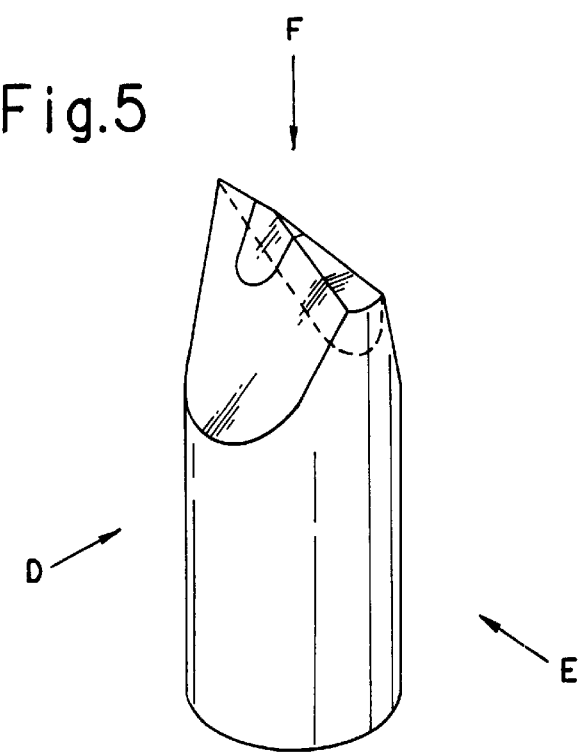
FIG. 5 is a perspective view showing another embodiment of an optical fiber having a convex lens constituting the LD module according to the invention.

The tip end surface (2E) intersects with the two inclined flat surfaces (2F, 2G) and an outer peripheral surface of the optical fiber, and it is preferable that the optical axis (z) penetrates the surface. The intersecting line between the tip end surface (2E) and the one inclined flat surfaces (2F) and the intersecting line between the tip end surface (2E) and the other inclined flat surfaces (2G) can be parallel or not parallel to each other. The tip end surface (2E) and the outer peripheral surface of the optical fiber can form two intersecting lines as shown in FIG. 3 by intersecting at two locations, or can form a single intersecting line as shown in FIG. 5 by intersecting at a single location.

If the optical fiber used in this invention is an optical fiber for single mode, the tip end surface (2E) must include at least a part of a core cross section.

In the optical fiber having a lens according to the invention, a tip end surface (2E) may be perpendicular or not perpendicular to the optical axis (z). A preferable design is that the tip end surface (2E) is not perpendicular to the optical axis (z). Where such a design is used, reflected light does not return directly to the laser light source because of the inclined tip end surface even where a part of the laser light radiated from the laser light source is reflected at the tip end surface, so that the laser light source can keep its stability. Therefore, where a design that the tip end surface does not intersect with the optical axis with a right angle is used, an anti-reflection coating (AR coating) formed on a tip of the fiber may be unnecessary to maintain the stability of the laser light source. The LD module therefore can simplify the manufacturing process and reduce the production costs. Alternatively, an anti-reflection coating can be formed where the design that the tip end surface does not intersect with the optical axis with a right angle is used, thereby surely solving the problem due to reflecting light.

When the design that tip end surface does not intersect with the optical axis with a right angle is used, the LD module also solves a problem of returning light. That is , even where light ray proceeding toward the light fiber light source is reflected at the tip of the fiber, the reflected light does not return in the fiber as it is because the tip end surface is inclined. Accordingly, a signal light going toward an exciting light source of a fiber amplifier may not return to the amplifier after reflected at the tip of the fiber. The invented LD module therefore can reduce sources of noises greatly and make sure the stable operation of the system such as the fiber amplifier.

The size and direction of the tip end surface (2E) can be preferably set as to reduce reflections of the laser light emitted from the laser light source at the tip end surface and to provide effective reductions of returning light in the fiber.

That is, to reduce the laser reflection light, the angle between the tip end surface (2E) and the virtual flat plane perpendicular to the optical axis (z) is of preferably 4 degrees or more, more preferably 6 degrees or more, further preferably 8 degrees or more. If the angle is equal to or more than 6 degrees, the LD module can keep the linearity of the current-optical output characteristics at least until around 60 mW of the laser output at the fiber end, and the module can be used without any problem. If the angle is equal to or more than 8 degrees, the module can be used without any problem until around 120 mW of the laser output at the fiber end.

The angle between the tip end surface (2E) and the virtual flat plane perpendicular to the optical axis (z) can realize light reflection loss of −25 dB or less if 4 degress or more, −40 dB or less if 6 degrees or more, and −50 dB or less if 8 degrees or more. In consideration of such relation, it is preferable to reduce returning light within the fiber in controlling the angle between the tip end surface (2E) and the virtual flat plane perpendicular to the optical axis (z) to be appropriate one.

On the other hand, if the angle between the tip end surface (2E) and the virtual flat plane perpendicular to the optica axis (z) is too large, the coupling efficiency may become worse and reduce the optical output. The angle is preferably 15 degrees or less, more preferably 10 degrees or less, further preferably 6 degrees or less.

The inclined direction of the tip end surface (2E) with respect to the virtual flat plane perpendiclar to the optical axis (z) is not specifically limited. The tip end surface (2E) can be a flat surface formed by rotation of the virtual flat plane perpendicular to the optical axis (z) around the X-axis shown in FIG. 3 as a rotation center or a flat surface formed by rotation around the Y-axis shown in FIG. 3 as a rotation center. The surface can be a flat surface rotated around an axis selected from other than the X-axis and the Y-axis. The structure shown in FIGS. 3, 4, has a flat surface, as a tip end surface, formed by rotation of the virtual flat plane around the X-axis shown in FIG. 3 as a rotation center. At that time, an intersecting line between one inclined flat surface (2G) and the tip end surface (2E) may be located on a tip side more than another intersecting line between the other inclined flat surface (2F) and the tip end surface (2E). In this invention, thus, either one of the intersecting line is preferably located on a tip side more than the other.

Figure 6A:
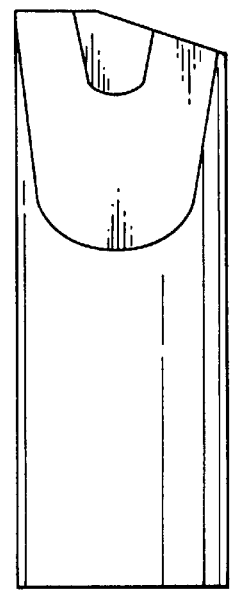
FIGS. 6(*a*), 6(*b*), and 6(*c*) are illustrations showing the optical fiber having the convex lens when seen in directions of arrows (A), (B), and (C), respectively, in FIG. 5.
Figure 6B:
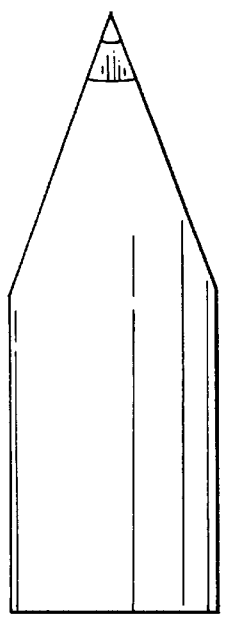
Figure 6C:
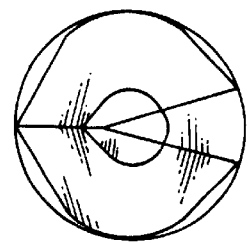
Figure 7:
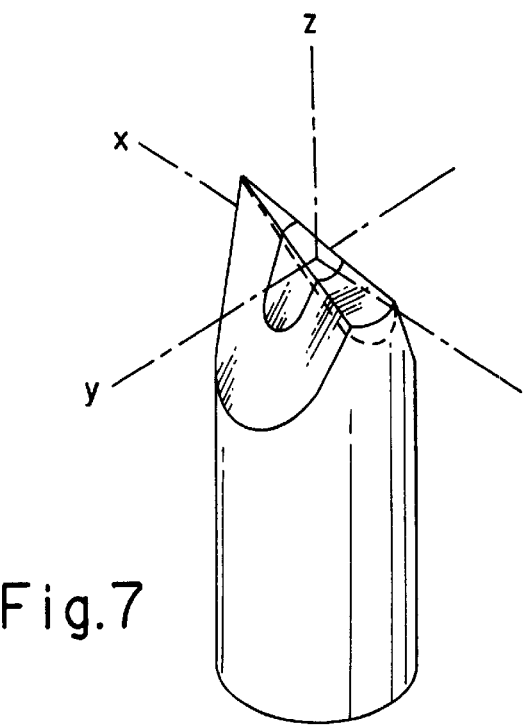
FIG. 7 is a perspective view showing yet another embodiment of an optical fiber having a convex lens constituting the LD module according to the invention.

FIGS. 5 to 7 show a structure having as a tip end surface a flat surface formed by rotation around the Y-axis shown as a rotation center. In FIGS. 5, 6, an intersecting line of the two inclined flat surfaces (2F, 2G) appears as a ridgeline on a structure of the optical fiber having a lens. On the other hand, in FIG. 7, an intersecting line of the two inclined flat surfaces (2F, 2G) does not appear on a structure of the optical fiber having a lens.

Figure 8:
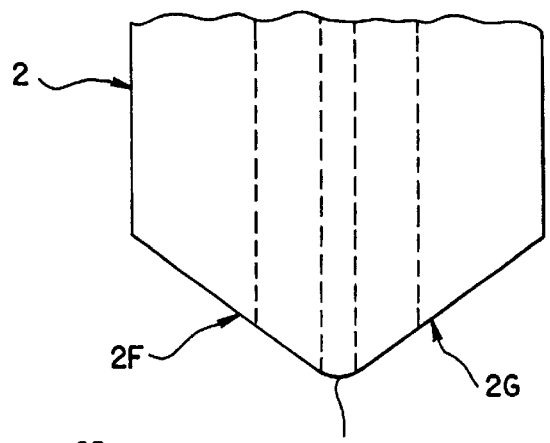
FIG. 8 is a plan view showing a tip end portion of the polarization maintaining fiber in FIG. 2.

In the embodiments shown in FIGS. 3 to 7, any of the inclined continuation planes and the tip end surface is formed only from flat surfaces, but one or more surfaces constituting the inclined continuation planes and the tip end surface (2E) may be formed of a curving surface or curving surfaces. FIG. 8 shows a cross section of a convex fiber lens in which a tip end surface (2E) that fabricated to have a curvature with a radius of about 3 to 7 microns is sandwiched by two inclined flat surfaces (2F, 2G). The two boundaries between the tip end surface (2E) as a curving surface and the adjacent inclined surfaces are straight lines. The direction of a curved surface is defined by a plane including the two boundaries for the purpose of the surface direction of such a curved surface.

Although in the embodiments shown in FIGS. 3 to 7, any of the embodiments has the tip end surface, an optical fiber having a convex fiber lens formed of only two inclined surfaces with no tip end surface can be used in this invention. The ridgeline at which the two inclined surfaces intersecting with each other preferably does not overlap on the vertical axis.

The manufacturing method for optical fiber formed with a convex fiber lens on the tip of the fiber is not specifically limited. This invention includes any optical fiber manufactured by any method as far as satisfying the conditions as described in the claims. Now, a preferred manufacturing method for an optical fiber having a convex fiber lens shown in FIG. 3 among optical fibers having convex fiber lenses is described below.

First, an optical fiber is cleaved preferably to form a flat surface perpendicular with respect to the optical axis. The end of the fiber secured to a holder is subsequently ground in contact with the surface of a grinder or a hone to produce a lens (1). More specifically, two inclined flat surfaces (2F, 2G) are formed by grinding the fiber end in inclining the fiber by respective prescibed angles for lift and right sides on the hone surface. After the ridgeline is formed thus from the intersecting line between the two inclined flat surfaces (2F, 2G), the formed ridgeline or the end of the ridgeline (apex) is pushed on the hone surface with a prescribed angle, thereby manufacturing an optical fiber having a convex fiber lens. Because a permissive error with respect to the inclined angle of the tip end surface (2E) can be taken in a relatively large amount, there would be no hardship in this fabrication. Any appropriate methods such as electroerosion machining can be used as a fabrication method for the inclined flat surfaces (2F, 2G) and the tip end surface (2E).

The convex fiber lens can be produced by, first, manipulation of one time core setting for determining a center line used as a reference and three fabrications for flat surfaces, so that a high fabrication accuracy can be obtained easily with lower costs. According to the above manufacturing method, the first core setting fabrication can set up a line to become a ridgeline at which inclined flat surfaces (2F, 2G) intersect with each other, so that the axial deviation between the ridgeline and the optical axis (z) is of 0.3 micron or less easily. Therefore, the optical fiber having the convex lens can be produced with high production yield and high coupling efficiency.

Where reflection factor of the external resonator is Rg and coupling efficiency of the LD light source and the optical fiber is K, light of $K^2Rg$ (K×KRg) returns to the LD chip among the light outputted from the LD light source. The coefficient $K^2Rg$ is referred to as the effective reflection factor. For example, if the coupling efficiency becomes 1.5 times, the effective reflection factor $K^2Rg$ becomes 2.5 times. Regarding the output at the end of the module, the effective coupling efficiency including the reflection factor is K−K×Rg, and under a practical condition that Rg shows several percent, the external resonator works well, while the fiber output of the module become improved.

In this invention, it is preferable to set that the effective reflection factor $K^2Rg$ is greater than reflection factor R of a front end surface of the LD light source. The reflection factor R cannot be lowered excessively from reasons of necessity of LD oscillation, demands on a structure, and necessity that the fiber output of the module should not be lowered. Therefore, in this invention, it is desirable that the coupling efficiency K is made higher and that the reflection factor Rg of the external resonator is set higher to some extent.

The core (2C) has a Bragg reflection layer serving as an external resonator. It is preferable that the LD light emitted from the LD chip (1A) is reflected by the Bragg reflection to render stable the center wavelength of the LD light.

In general, if the polarization state of the LD light and the polarization condition of the LD reflected light do not coincide with each other, the amplifying rate of the LD reflected light from the external resonator within the LD chip is not maximized, so that the intensity of the external resonator may be weakened. The polarization state within the fiber is normally changed easily depending on the temperature and the bending state of the fiber. Therefore, the reflection light from the fiber grating changes its polarization state when backing to the LD chip. Accordingly, for the LD module of the invention, it is desirable to control the module to keep the polarization state within the fiber. Where the polarization state within fiber is controlled, the stability in locking the wavelength in use of the fiber grating can be further improved. More specifically, it is desirable to use a combination for high coupling efficiency by employing a polarization maintaining fiber and a fiber lens having a high image conversion function.

Figure 9:
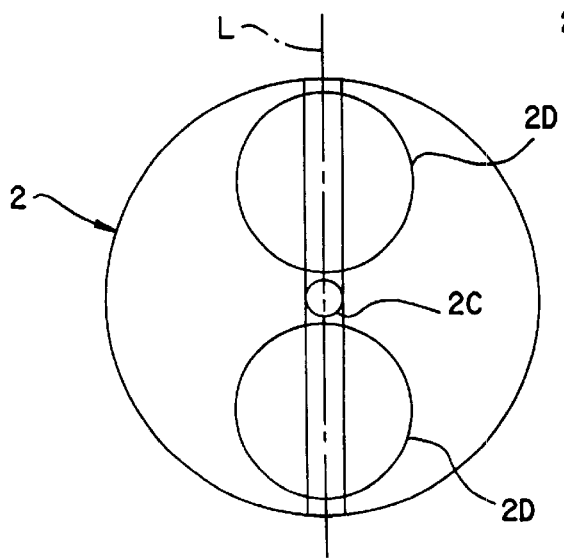
FIG. 9 is a front view showing a convex fiber lens located at a tip of the optical fiber constituting the LD module according to the invention.

Exemplified as a polarization maintaining fiber is such that a convex fiber lens formed on a tip has different opening angles in the vertical direction and the horizontal direction, and that the angle between the vertical axis and the through axis (L) as a polarization maintaining axis connecting the centers of the two stress application portions (2D, 2D) in the optical fiber is small (see, FIG. 9). The angle is preferably of 20 degrees or less, more preferably of 10 degrees or less, furter preferably 5 degrees or less. The best angle is zero degree, and at that time, if the through axis (L) is made to coincide with the polarization direction of the LD light, the vertical axis of the fiber lens comes to coincide with polarization direction of the LD light, and the light can be condensed in correcting the aspect ratio of the LD light which forms images by the lens system (3), so that the optical coupling efficiency can be maximized.

The polarization maintaining fiber is preferably coupled with an LD light source so that the extinction ratio of the LD light transmitting the polarization maintaining fiber upon lighting the LD light source becomes a prescribed amount or more. A desirable coupling brings extinction ratio of preferably 10 dB or greater, more preferably 20 dB or greater, further preferably 30 dB or greater.

The assembling method for the invented LD module is not specifically limited, and for example, the module can be assembled as follows in use of a special assembling apparatus. The assembling apparatus includes a first stage movable in the orthogonal triaxial directions, the optical axis Z direction, and X, Y directions, in holding, e.g., the light source holder (4), and a second stage pivotally movable around the optical axis Z in holding the lens holder (7) welded in advance to the ferrule holder (5), as means for relatively pivotally moving the LD light source (1) and the optical fiber (2) around the optical axis and matching the optical axes with each other.

The above assembling apparatus includes an analyzer made of a polarization plate supported as to be pivotally movable around the optical axis Z in facing to the end of the optical fiber (2) held in the ferrule holder (5), a photo diode for photo-electron conversion upon reception of the LD light transmitting through the analyzer, an operation unit for calculating the extinction ratio based on the detected data from the photo diode, and motor apparatus for displaying the detected data from the photo diode and the calculated extinction ratio. The extinction ratio (dB) is defined as −10 log (B/A) wherein A is the maximum value of the detected data from the photo diode where the analyzer is rotated around the optical axis Z and B is the minimum value of the same.

To assemble the LD module of the invention, first, the light source holder (4) is held on the first stage of the assembling apparatus, and the lens holder (7) is held on the second stage. The first stage is moved in X, Y, Z directions to render the light source holder (4) and the lens holder (7) in-line, thereby contacting the connecting ends of both with each other while the optical axes of both are made to coincide with each other. This contact pressure is generally of about 0.5 to 3 kgf.

Then, after the LD light source (1) is turned on, the analyzer is moved pivotally so that the detected data of the photo diode shows a maximum value, and subsequently, the analyzer is rotated about 90 degrees so that the detected date becomes the minimum value. The extinction ratio can be sought based on the maximum and minimum data thus obtained by this manipulation. A targeted extinction ratio is 20 dB or more, preferably 30 dB or more.

When the extinction ratio sought by the above manipulation is larger than the targeted value, the lens holder (7) is rotated by a presciped angle (e.g., 3 to 5 angles) with respect to the light source holder (4) by rotating the second stage toward the optical axis Z, and subsequently, the extinction ratio is sought again by substantially the same manipulation. When this extinction ratio comes closer to the targeted value, the lens holder (7) is further rotated for a prescribed angle, but when the extinction ratio goes away from to the targeted value, the lens holder (7) is rotated in the reverse direction within a prescribed angle, and the extinction ratio is sought again. Hereinafter, the same operation is repeated to position the light source holder (4) and the lens holder (7) around the optical axis so that the extinction ratio becomes 20 dB or more, preferably 30 dB or more. That is, the LD light source (1) and the optical fiber (2) are positioned to match the optical axis.

After work for positioning the LD light source (1) and the optical fiber (2) around the optical axis, the LD light source (1) and optical fiber (2) are subject to optical axis matching work. This work is done accurately in use of the above assembling apparatus by removing the analyzer, receiving, directly by the photo diode, the LD light transmitting the optical fiber (2), and very slightly moving the first stage in the X, Y directions so as to make the photo amount the maximum. In such a case, after the first stage is manipulated in a very small amount of 30 microns or the like along the X axis, the first stage is then manipulated in a very small amount of 30 microns or the like along the Y axis.

When the matching work of the optical axes of the LD light source (1) and the optical fiber (2) is completed, the connecting portion between the light source holder (4) and the lens holder (7) is welded by laser beam to assemble the LD module.

The polarization direction of the LD light substantially coincides with the through axis (L) as a polarization maintaining axis of the optical fiber, because the LD module of the invention thus assembled according to the above assembling method is so coupled that the extinction ratio of the LD light transmitting the optical fiber (2) by amission from the LD light source (1) is 20 dB or greater, preferably 30 dB or greater. The polarization direction of the LD light substantially coincides with the vertical axis of the convex fiber lens (2A) because the tip end surface (2E) extending along the vertical axis of the convex fiber lens (2A) is formed to coincide with the through axis (L) connecting the centers of the two stress application portions (2D, 2D) of the optical fiber (2).

According to the LD module of the invention, a very high optical coupling efficiency can be obtained because the convex lens (3A, 3B) of the lens system (3) forms images by the LD light emitted from the LD chip (1A) and the convex fiber lens (2A) of the optical fiber (2) condenses light ray effectively in correcting the aspect ratio. The LD module, since the optical coupling rate is very high, can remarkably improve the life span reliability by rendering the LD chip (1A) of the LD light source (1) customized for small output. The Bragg reflection layer formed on the core (2C) of the optical fiber (2) may adequately serve as an external resonator for stabilizing the center wavelength of the LD light, so that the module can indicate excellent characteristics for locking wavelength, and so that the module is preferable for high speed telecommunication.

The invention is further described next in detail by raising some Examples. Sizes, degrees, processing methods, and so on shown below in Examples can be changed as far as such changes go beyond the spirit of the invention. Therefore, the scope of the invention is not limited to Examples as described below.

EXAMPLE 1

As shown in FIG. 1, an LD module was produced including an LD light source (1) having a CAN package structure in which an LD chip (1A) is incorporated with an LD preservation gas, an optical fiber (2) on one end of which a convex fiber lens (2A) for condensing light is formed, and a lens system (3) for coupling placed between the LD light source (1) and the convex fiber lens (2A). The lens system (3) was constituted to be capable of forming an image by condensing the LD light from the LD chip (1A), and the convex fiber lens (2A) is located so that a focal point (P) coincides with the image forming point of the LD light.

The LD chip (1A) of the LD light source (1) was sealed in a CAN (1B) with the LD preservation gas haveing a main component of a nitrogen gas. The LD chip (1A) was driven with 40 to 60 mA, and emitted the LD light of 300 mW output having a center wavelength of 980 nm. The mode field pattern of the LD light was elliptical having a major diameter of 5 microns and a minor diameter of 2 microns with respect to ($1/e^2$), and the light ray was radiated in an elliptical shape outside the CAN (1B) through a light transmission glass (1C) fitted in the transmission window. The LD light source 1 was held in the cylindrical light source holder (4) where the light transmission glass (1C) was oriented to one end.

The optical fiber (2) is made of a polarization maintaining fiber, which is so called to as a PANDA fiber having circle cross section, and as shown in FIG. 2, a core (2C) having a large refractive index was arranged at a center of a clad (2B) having a smaller refractive index where stress application portions (2D, 2D) having a circle cross section were provided on the opposite sides of the core, to produce the polarization maintaining fiber. The core (2C) is formed with a Bragg reflection layer serving as an external resonator, and the module is structure to stabilize the center wavelength of the LD light by the Bragg reflection of the LD light emitted form the LD chip (1A). The reflection factor was set to 3 to 5%. The optical fiber (2) had a diameter of 125 microns and was held by a ferrule (6) at a center of the cylindrical ferrule holder (5).

The convex fiber lens (2A) was formed to have a shape having an apex in which the opening angle in the vertical axis direction was different from the opening angle in the horizontal axis direction. More specifically, as shown in FIG. 8, the apex was formed in a stapled form of 110 degrees, and the tip end surface (2E) extending the vertical axis was fabricated to be curved with a radius of curvature of 5 microns. The apex of the tip end surface of the convex fiber lens (2A) was formed to coincide with the through axis (L) connecting the centers of the two stress application portions (2D, 2D) of the optical fiber (2). The module was structure to be able to condense the light in correcting the aspect ratio of the LD light to be formed by the lens system (3) while the vertical axis of the convex fiber lens was arranged along the polarization direction of the LD light. The focal distance of the convex fiber lens was 5 microns.

The lens system (3) was constituted of a pair of convex lenses (3A, 3B), and the LD light from the LD chip (1A) was made to form images at the focal point (P) of the convex fiber lens (2A). The image magnification was 1.3 times. The pair of convex lenses (3A, 3B) were held in the cylindrical lens holder (7) one end of which is welded in advance by laser beam to an end of a ferrule holder (5) on a side of the convex fiber lens (2A). The other end of the lens holder (7) is welded by laser beam to an end of the light source holder (4) on a side that the LD light is radiated.

It is to be noted that in this Example and the following Examples, where the conditional values were specified by some numeral ranges, value were selected as to make the coupling efficiency higher in those ranges and executed.

EXAMPLE 2

The LD module was produced in the same manner as those in Example 1 except the shape of the convex fiber lens was changed to a shape made of three flat surfaces shown in FIG. 5. In FIG. 5, the angle between two inclined flat surfaces and the optical axis were 35 to 45 degrees, and the ridgeline formed by intersecting the two inclined flat surfaces was made vertical, where the angle between the tip end surface and the virtual flat plane perpendicular to the optical axis was 6 degrees, and where the width of the tip end surface at the core was 1.0 to 4.0 microns.

EXAMPLE 3

The LD module was produced in the same manner as those in Example 1 except the shape of the convex fiber lens was changed to a shape made of three flat surfaces shown in FIG. 5 and the reflection factor Rg was set to 5 to 7% of the front end surface of the fiber grating. In FIG. 5, the angles between two inclined flat surfaces and the optical axis were 35 to 45 degrees, and the ridgeline formed by intersecting the two inclined flat surfaces was made vertical, where the angle between the tip end surface and the virtual flat plane perpendicular to the optical axis was 8 degrees, and where the width of the tip end surface at the core was 1.0 to 4.0 microns.

EXAMPLE 4

The LD module was produced in the same manner as those in Example 1 except the shape of the convex fiber lens was changed to a shape shown in FIG. 5 (but the tip end surface was fabricated to be curved) and the reflection factor Rg was set to 5 to 7% of the front end surface of the fiber grating, In FIG. 5, the angles between two inclined flat surfaces and the optical axis were 35 to 45 degrees, and the ridgeline formed by intersecting the two inclined flat surfaces was made vertical, where the angle between the tip end surface and the virtual flat plane perpendicular to the optical axis was 9 degrees, where an R fabrication for a radius of curvature of 6 microns was made on the tip end surface, and where the width of the tip end surface at the core was 1.0 to 4.0 microns.

COMPARATIVE EXAMPLE 1

The LD module was produced in the same manner as those in Example 1 except preparation of the optical fiber tip of the reflection factor of 3 to 5% without forming any lens by grinding the optical fiber tip.

COMPARATIVE EXAMPLE 2

The LD module was produced in the same manner as those in Example 1 except preparation of the optical fiber tip of the reflection factor of 8% without forming any lens by grinding the optical fiber tip.

Experiments

The six type LD modules thus produced were measured for optical coupling efficiency, wavelength locking characteristics, interference with return light, and returning loss and were evaluated.

The wavelength locking characteristics was evaluated by searching the temperature range in which the wavelength locking could be found where the output of the LD module was set to 60 mW and the temperature was changed within a range of 0 to 50 degrees Celsius. At that time, the wavelength locking was found when the output from other than the fiber grating deducted by the output of the fiber grating was −6 dB or less.

The interference of the returning light was evaluated by searching output areas showing that the LD module indicated some practical level at temperature of 25 degrees Celsius.

Table below shows the results.

TABLE

| | Reflection Factor Rg | Coupling Efficiency | Wavelength Locking Characteristics | Interference With the Returning Light | Return Loss |
|---|---|---|---|---|---|
| Example 1 | 3 to 5% | 78% | 5 to 45° C. | 60 mW or less | Less than −15 dB |
| Example 2 | 3 to 5% | 77% | 5 to 45° C. | — | Less than −40 dB |
| Example 3 | 5 to 7% | 75% | 0 to 50° C. | 150 mW or less | Less than −50 dB |
| Example 4 | 5 to 7% | 75% | 0 to 50° C. | 150 mW or less | Less than −50 dB |
| Comparative Example 1 | 3 to 5% | 50% or less | 15 to 35° C. | 120 mW or less | Less than −50 dB |
| Comparative Example 2 | 8% | 50% or less | 15 to 35° C. | 120 mW or less | Less than −50 dB |

The above Table indicates that the LD modules of the invention had higher coupling efficiency, good wavelength locking characteristics, smaller interference with the returning light, and the smaller returning loss. On the other hand, in the LD modules of Comparative Examples in which no convex fiber lens was formed on the tip end, the wavelength locking characteristics or the like could not be improved even where the reflection factor was raised.

What is claimed is:

1. An LD module comprising:
    an LD light source having a CAN package structure in which an LD chip is incorporated with an LD preservation gas;
    an optical fiber on one end of which a convex fiber lens for condensing light is formed; and
    a lens system for coupling placed between the LD light source and the convex fiber lens, wherein the lens system is constituted to be capable of forming an image by condensing the LD light from the LD chip, and wherein the convex fiber lens is located so that a focal point coincides with the image forming point of the LD light.

2. The LD module according to claim 1, wherein the optical fiber is a polarized plane maintaining fiber.

3. The LD module according to claim 2, wherein a polarization maintaining axis of the polarization maintaining fiber is placed to coincide with the polarization direction.

4. The LD module according to claim 2, wherein the LD light source, the optical fiber, and the lens system are so located that a polarization extinction ratio of the LD light transmitting through the polarization maintaining fiber is equal to or greater than 10 dB.

5. The LD module according to claim 4, wherein the polarization extinction ratio is equal to or greater than 20 dB.

6. The LD module according to claim 2, wherein the convex fiber lens is formed to have an opening angle in a vertical axis direction perpendicular to the optical axis direction of the optical fiber and an opening angle in a horizontal axis direction perpendicular to the optical axis direction of the optical fiber wherein the opening angle in the horizontal axis direction is different from the opening angle in the vertical axis direction.

7. The LD module according to claim 6, wherein an angle between the vertical axis direction and a through axis as a polarization maintaining axis perpendicular to the optical axis direction of the optical fiber is set 20 degrees or less.

8. The LD module according to claim 7, wherein the angle between the vertical axis direction and the through axis is zero degree.

9. The LD module according to claim 6, wherein the convex fiber lens is in a shape having an apex.

10. The LD module according to claim 6, wherein the convex fiber lens is made of two inclined planes which come closer to each other as approaching to a tip of the optical fiber.

11. The LD module according to claim 10, wherein a ridgeline between the two inclined planes does not overlap on the vertical axis.

12. The LD module according to claim 9, wherein the convex fiber lens is made of a tip end surface and two inclined continuation planes which intersect with the tip end surface and come closer to each other as approaching to a tip of the optical fiber.

13. The LD module according to claim 12, wherein the tip end surface is a curving surface.

14. The LD module according to claim 12, wherein the tip end surface is a flat surface.

15. The LD module according to claim 12, wherein the tip end surface does not intersect the optical axis direction of the optical fiber with a right angle.

16. The LD module according to claim 12, wherein at least one of the two inclined continuation planes includes a curving surface.

17. The LD module according to claim 12, wherein the two inclined continuation planes include only flat surfaces.

18. The LD module according to claim 17, wherein each of the two inclined continuation planes includes an inclined flat surface.

19. The LD module according ot claim 18, wherein a difference between an angle formed between one of the inclined flat surface of the convex fiber lens and the optical axis of the optical fiber and an angle formed between the other of the inclined flat surface ofthe convex fiber lens and the optical axis of the optical fiber is equal to or less than 10 degrees.

20. The LD module according to claim 18, wherein a distance between a line formed by intersecting the two inclined flat planes of the convex fiber lens with each other and the optical axis of the optical fiber is equal to or less than 1 micron.

21. The LD module according to claim 18, wherein an angle between the tip end surface of the convex fiber lens and a plane perpendicular to the optical axis of the optical fiber is of 6 to 15 degrees.

22. The LD module according to claim 12, wherein an intersecting line between one inclined continuation plane of the convex fiber lens and tip end surface and another intersecting line between the other inclined continuation plane of the convex fiber lens and the tip end surface are parallel to each other.

23. The LD module according to claim 12, wherein an intersecting line between one inclined continuation plane of the convex fiber lens and the tip end surface is located on a tip side more than another intersecting line between the other inclined continuation plane of the convex fiber lens and the tip end surface.

24. The LD module according to claim 12, wherein a ridgeline exists which is formed by the two inclined continuation planes of the convex fiber lens.

25. The LD module according to claim 12, wherein any ridgeline does not exist which is formed by the two inclined continuation planes of the convex fiber lens.

26. The LD module according to claim 12, wherein a width of the tip end surface of the convex fiber lens is narrower than a diameter of a mode field of the optical fiber.

27. The LD module according to claim 1, wherein the convex fiber lens has an anti-reflecting coating on a surface of the lens.

28. The LD module according to claim 1, wherein the optical fiber is a single mode optical fiber.

29. The LD module according to claim 1, wherein a part of the lens system is incorporated in the light transmission window of the light source.

30. The LD module according to claim 1, wherein an image forming magnification of the LD light of the lens system is of 0.5 to 10.

31. The LD module according to claim 1, wherein the optical fiber serves as an external resonator for stabilizing a center wavelength of the LD light by Bragg reflection of the LD light emitted form the LD chip.

32. The LD module according to claim 1, wherein effective reflection factor $K^2Rg$ is greater than reflection factor R of a front end surface of the LD light source where reflection factor of the external resonator is Rg and coupling efficiency of the LD light source and the optical fiber is K.

33. The LD module according to claim 1, wherein the center wavelength of the LD light is of 500 to 1400 nm.

34. The LD module according to claim 1, wherein the center wavelength of the LD light is of 700 to 1000 nm.

* * * * *